US 7,904,610 B2

(12) United States Patent
Narayanan et al.

(10) Patent No.: US 7,904,610 B2
(45) Date of Patent: *Mar. 8, 2011

(54) CONTROLLING A DEVICE CONNECTED TO FIRST AND SECOND COMMUNICATION PATH WHEREIN DEVICE IS ALSO CONNECTED TO THIRD COMMUNICATION PATH VIA A BYPASS LINK

(75) Inventors: Kaushik R. Narayanan, Redmond, WA (US); Robert J. Martin, Bellevue, WA (US); Jerry Gibson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 649 days.

This patent is subject to a terminal disclaimer.

(21) Appl. No.: 11/471,752

(22) Filed: Jun. 21, 2006

(65) Prior Publication Data

US 2007/0297600 A1 Dec. 27, 2007

(51) Int. Cl.
*G06F 15/16* (2006.01)
*G06F 11/00* (2006.01)
*G06F 3/00* (2006.01)

(52) U.S. Cl. ........... 710/15; 710/302; 710/303; 710/304; 710/52; 710/62; 714/27; 714/28; 714/32; 714/33; 714/37; 709/224; 709/223; 713/300; 713/310

(58) Field of Classification Search .............. 710/52, 710/62, 302–304, 15; 714/32, 33, 37, 27, 714/28; 713/310, 300; 709/223, 224
See application file for complete search history.

(56) References Cited

U.S. PATENT DOCUMENTS

| 4,747,041 | A | | 5/1988 | Engel et al. |
| 5,560,022 | A | | 9/1996 | Dunstan et al. |
| 5,586,268 | A | | 12/1996 | Chen et al. |
| 5,640,510 | A | * | 6/1997 | Hanaoka et al. ................ 714/42 |
| 5,862,393 | A | | 1/1999 | Davis |
| 6,134,593 | A | | 10/2000 | Alexander et al. |
| 6,324,605 | B1 | | 11/2001 | Rafferty et al. |
| 6,415,342 | B1 | | 7/2002 | Wahl et al. |
| 6,438,711 | B2 | * | 8/2002 | Woodruff ........................ 714/27 |
| 6,549,968 | B1 | * | 4/2003 | Hart ............................. 710/303 |
| 6,586,849 | B2 | | 7/2003 | Tarr |
| 6,657,534 | B1 | | 12/2003 | Beer et al. |
| 6,704,826 | B1 | * | 3/2004 | Lam et al. ..................... 710/302 |
| 6,704,827 | B1 | * | 3/2004 | Smith et al. ................... 710/302 |
| 6,732,296 | B1 | * | 5/2004 | Cherny et al. .................. 714/32 |
| 6,757,783 | B2 | | 6/2004 | Koh |
| 6,772,265 | B2 | * | 8/2004 | Baweja et al. ................ 710/303 |
| 6,780,048 | B2 | | 8/2004 | Chen et al. |
| 6,785,845 | B2 | * | 8/2004 | Venkataraman ................ 714/27 |
| 6,804,740 | B1 | * | 10/2004 | Watts, Jr. ...................... 710/303 |
| 6,813,523 | B2 | | 11/2004 | Mauro |
| 6,823,415 | B1 | * | 11/2004 | Asaad et al. .................. 710/303 |

(Continued)

OTHER PUBLICATIONS

IBM-TDB, "Non-invasive Automation of Software Test with Shared Peripherals," vol. 35, Issue #2, pp. 230-232, Jul. 1, 1992.*

(Continued)

*Primary Examiner* — Tammara Peyton

(57) ABSTRACT

An apparatus includes a memory unit, a microcontroller, a first communication port providing a first communication path between the apparatus and a computer system, and a second communication port providing a second communication path between the apparatus and a peripheral device. The peripheral device is also communicatively linked with the computer system via a third communication path that bypasses the apparatus. Control of the peripheral device is subject to the apparatus.

20 Claims, 6 Drawing Sheets

U.S. PATENT DOCUMENTS

| | | | |
|---|---|---|---|
| 6,868,468 B2* | 3/2005 | Boz et al. .................. 710/304 |
| 6,873,927 B2* | 3/2005 | Chi et al. ................... 702/117 |
| 6,881,098 B2 | 4/2005 | Jeansonne et al. |
| 6,883,054 B2* | 4/2005 | Yamaguchi et al. ......... 710/302 |
| 6,883,055 B2* | 4/2005 | Chen et al. ................. 710/302 |
| 6,963,933 B2 | 11/2005 | Saito et al. |
| 7,103,802 B2* | 9/2006 | Stephens et al. ............ 714/32 |
| 7,114,020 B1 | 9/2006 | Smart et al. |
| 7,168,016 B2* | 1/2007 | Campardo et al. ........... 714/718 |
| 7,216,184 B2 | 5/2007 | Milner et al. |
| 7,240,111 B2 | 7/2007 | VanHarlingen et al. |
| 7,262,686 B2 | 8/2007 | Stewart et al. |
| 7,418,377 B2* | 8/2008 | Poley et al. ................. 703/24 |
| 7,451,349 B2* | 11/2008 | Tsai et al. .................. 714/27 |
| 2002/0052940 A1* | 5/2002 | Myers et al. ................ 709/223 |
| 2003/0071927 A1 | 4/2003 | Park et al. |
| 2003/0093599 A1 | 5/2003 | Lou et al. |
| 2003/0105606 A1 | 6/2003 | Poley et al. |
| 2005/0268043 A1 | 12/2005 | Kitamura |
| 2006/0056401 A1 | 3/2006 | Bohm et al. |
| 2006/0182110 A1 | 8/2006 | Bomhoff et al. |
| 2006/0274753 A1 | 12/2006 | Park et al. |

OTHER PUBLICATIONS

Office Action cited in related U.S. Appl. No. 11/413,496 dated Sep. 29, 2008.

Office Action cited in related U.S. Appl. No. 11/413,496 dated Apr. 15, 2009.

Byers, J.A., "Versatile electronic timer for synchronous switching of multiple electrical devices", Behavior Research Methods & Instrumentation, 1981, 13:381-383. http://www.wcrl.ars.usda.gov/cec/papers/bm81.htm.

Miller, M.E., Hludik, F.C., Miller, W.T., "The project 54 common interface for the intelligent transportation systems data bus," University of New Hampshire, ECE Department, Kingsbury Hall, Durham, NH 03824, 5 pages, http://viola.usc.edu/paper/vc/2002/T07-017.pdf.

Tan, KK,Soh, CY, wang, KN, "Development of an internet home control system," Proceedings of the 2002 IEEE International Conference on Control Aplications, Sep. 18-20, 2002, Glasfow, Scotland, U.K., pp. 1120-1125, http://ieeexplore.ieee.org/cpl/abs_free.jsp?arNumber=1038762.

4 x 4 Peripheral Switch, Share four USB devices with up to four computers, User Manual, Belkin Corporation, 501 West Walnut Street, Compton, CA 90220, 2002, pp. 1-21.

USB MultiSwitch Hub, Product escription, SMSC, 80 Arkay Drive, Hauppauge, NY 11788, http://www.everythingusb.com/smsc_multiswitch_hub.html, Apr. 2006, pp. 1-2.

Welcome to Belkin - 4x4 USB Peripheral Switch, Product Description, Belkin Corporation, 501 West Walnut Street, Compton, CA 90220, 2005, p. 1.

Andrew s. Tanenbaum, Structured computer Organization, 1984, Prentice-Hall, Second Edition, pp. 10-12.

Office Action cited in related U.S. Appl. No. 11/471,211 dated Apr. 21, 2008.

Office Action cited in related U.S. Appl. No. 11/471,211 dated Oct. 22, 2008.

Office Action cited in related U.S. Appl. No. 11/471,211 dated Apr. 9, 2009.

Office Action cited in related U.S. Appl. No. 11/471,211 dated Sep. 29, 2009.

* cited by examiner

CONTROLLING A DEVICE CONNECTED TO FIRST AND SECOND COMMUNICATION PATH WHEREIN DEVICE IS ALSO CONNECTED TO THIRD COMMUNICATION PATH VIA A BYPASS LINK

BACKGROUND

In general, before a product—hardware or software—is brought to market, it may be tested in different ways, to demonstrate its workability or to determine whether it is compatible with other products, for example. In the computer industry, for example, a prototypical consumer electronic device may be tested by repeatedly plugging it into and unplugging it from a computer system under various operating conditions. That is, the device may be "hot swapped" into and out of the computer system with the computer in different power states (e.g., full power, sleeping or hibernating, standby) and also with the computer turned off. Testing of this sort may be performed hundreds or thousands of times per device.

The nature of the testing can be time-consuming, which can increase costs. These problems are magnified when it is necessary or desirable to test a number of devices in parallel. Different combinations of the devices may need to be tested, each combination at different power conditions. Not only can this increase the cost and duration of the testing, but managing and implementing such a variety of tests can be unduly complex.

A solution to the problems mentioned above would thus be advantageous.

SUMMARY

In one embodiment, an apparatus includes a memory unit, a microcontroller, a first communication port providing a first communication path between the apparatus and a computer system, and a second communication port providing a second communication path between the apparatus and a peripheral device. The peripheral device is also communicatively linked with the computer system via a third communication path that bypasses the apparatus. Control of the peripheral device is subject to the apparatus.

The drawings referred to in this description should not be understood as being drawn to scale except if specifically noted.

DETAILED DESCRIPTION

Reference will now be made in detail to various embodiments, examples of which are illustrated in the accompanying drawings. While the subject matter defined in the appended claims is described in conjunction with these embodiments, it is to be understood that the subject matter of the appended claims is not limited to these embodiments. On the contrary, these embodiments are intended to cover alternatives, modifications and equivalents that may be included within the spirit and scope of the subject matter of the appended claims. Furthermore, in the following description, numerous specific details are set forth in order to provide a thorough understanding, while in other instances, well-known methods, procedures, components, and circuits have not been described in detail so as not to unnecessarily obscure aspects of these embodiments.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, terms such as "providing," "simulating," "sensing," "sending," "receiving," "storing," "executing," "monitoring," "controlling," "asserting," "affecting" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

Figure 1:
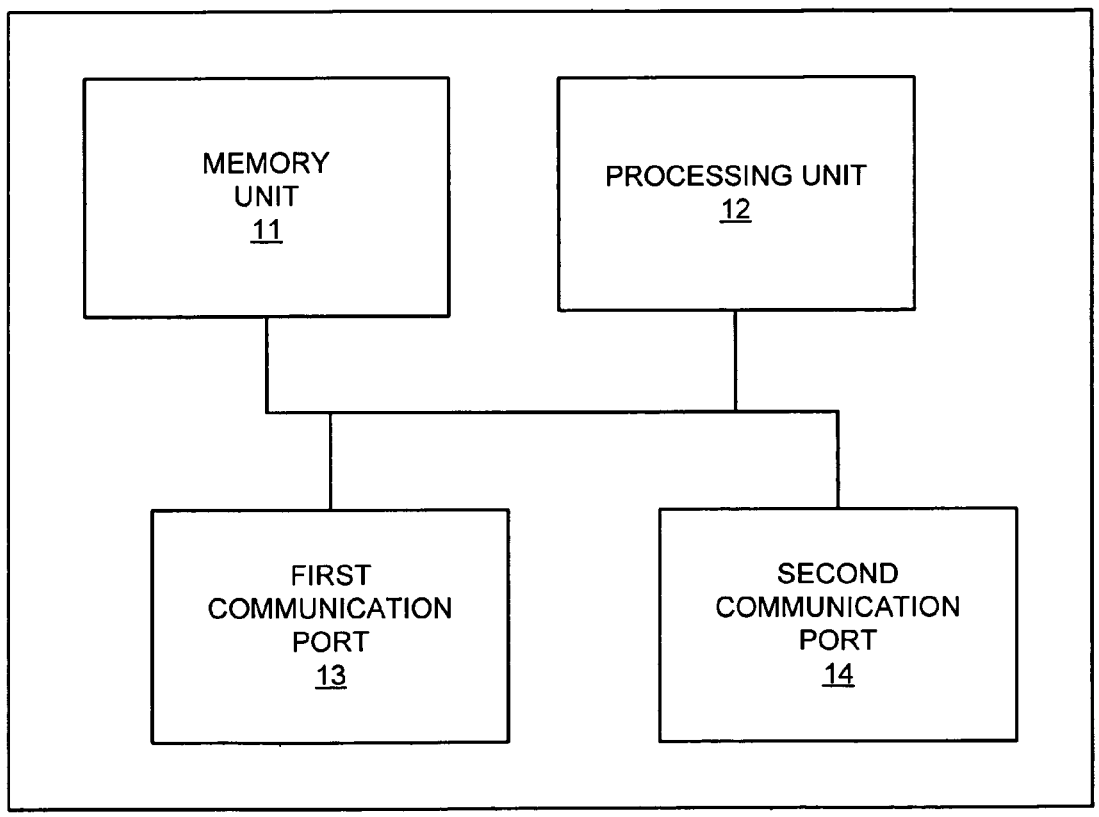
FIG. 1 is a block diagram of an embodiment of a control unit.

FIG. 1 is a block diagram of one embodiment of a device 10, which may be referred to herein as a control unit.

Device 10 is only one example of a suitable computing environment and is not intended to suggest any limitation as to scope of use or functionality. Neither should device 10 be interpreted as having any dependency or requirement relating to any one or combination of components illustrated in the exemplary device 10. For example, although device 10 is illustrated as having a single memory unit 11, device 10 may actually incorporate multiple memories. In that respect, memory unit 11 can be regarded as being representative of all of the memory units that may be present in device 10.

Embodiments may be described herein in the general context of computer-executable instructions, such as program modules, being executed by a computer. Generally, program modules include routines, programs, objects, components, data structures, etc., that perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 1, components of device 10 may include, but are not limited to, a memory unit 11 and a processing unit 12. In one embodiment, memory unit 11 includes EEPROM (electrically erasable programmable read-only memory) that may be implemented as flash memory. In one embodiment, processing unit 12 is a microprocessor or microcontroller. In one embodiment, memory unit 11 and processing unit 12 are implemented as a system on a chip that includes other components such as static random access memory (SRAM).

In the example of FIG. 1, device 10 includes a first communication port 13 and a second communication port 14. There may be additional communication ports—any number of communication ports may be included depending on, for example, the capabilities (e.g., the processing power and memory capacity) of processing unit 12. Two or more devices 10 can be utilized in parallel to increase the number of communication ports beyond that provided by a single device. In one embodiment, device 10 includes eight communication ports.

The communication ports 13 and 14 are used to communicatively link device 10 with other devices. These other devices may include a computer system as well as other types of devices, referred to herein as peripheral devices. Peripheral devices can include the types of devices that may be connected to a computer system, such as, but not limited to, printers, scanners, keyboards, mice, cameras and memory devices (e.g., memory capacity devices such as hard drives, or portable memory devices such as removable flash memory cards). Peripheral devices can also include devices that are connected to a computer system but may be internal to the computer system housing, such as, but not limited to, PCMCIA (Personal Computer Memory Card International Association) cards, video cards and sound cards.

In one embodiment, the communication ports 13 and 14 are standardized or generic in that they are the same, in conformity with one another. In such an embodiment, the communication ports 13 and 14 are adapted in some way so that they can accommodate the different types of connectors and connections that may be utilized by the peripheral devices.

The types of connectors and connections are also referred to herein as types of communication interfaces. Examples of communication interfaces that can be utilized with device 10 include, but are not limited to, universal serial bus (USB), IEEE-1394 (referred to as Firewire), peripheral component interface (PCI), human interface device (HID) (e.g., keyboard), intelligent drive electronics or integrated drive electronics (IDE), small computer system interface (SCSI), serial, Ethernet, and generic.

In one embodiment, the standardized communication ports 13 and 14 are adapted for different types of communication interfaces using modules or elements that may also be referred to as pods. An embodiment of an interface element is described further in conjunction with FIG. 2, below. As will be seen, the interface elements or modules can be used to provide functionality in addition to the adapting function. For example, they can be used to turn a device on or off.

Continuing with reference to FIG. 1, there are a number of advantages associated with using standardized communication ports in combination with adapting modules. For example, device 10 is readily extensible to new types of communication interfaces that may come into existence. Furthermore, new functionality can be added by introducing a new type of module that implements that functionality.

In an alternative embodiment, device 10 may include communication ports that are specific to the various types of communication interfaces (e.g., device 10 may include a USB port, an IEEE-1394 port, and so on), or device 10 may include a combination of standardized (generic) ports and ports specific to a particular type of communication interface.

Figure 2:
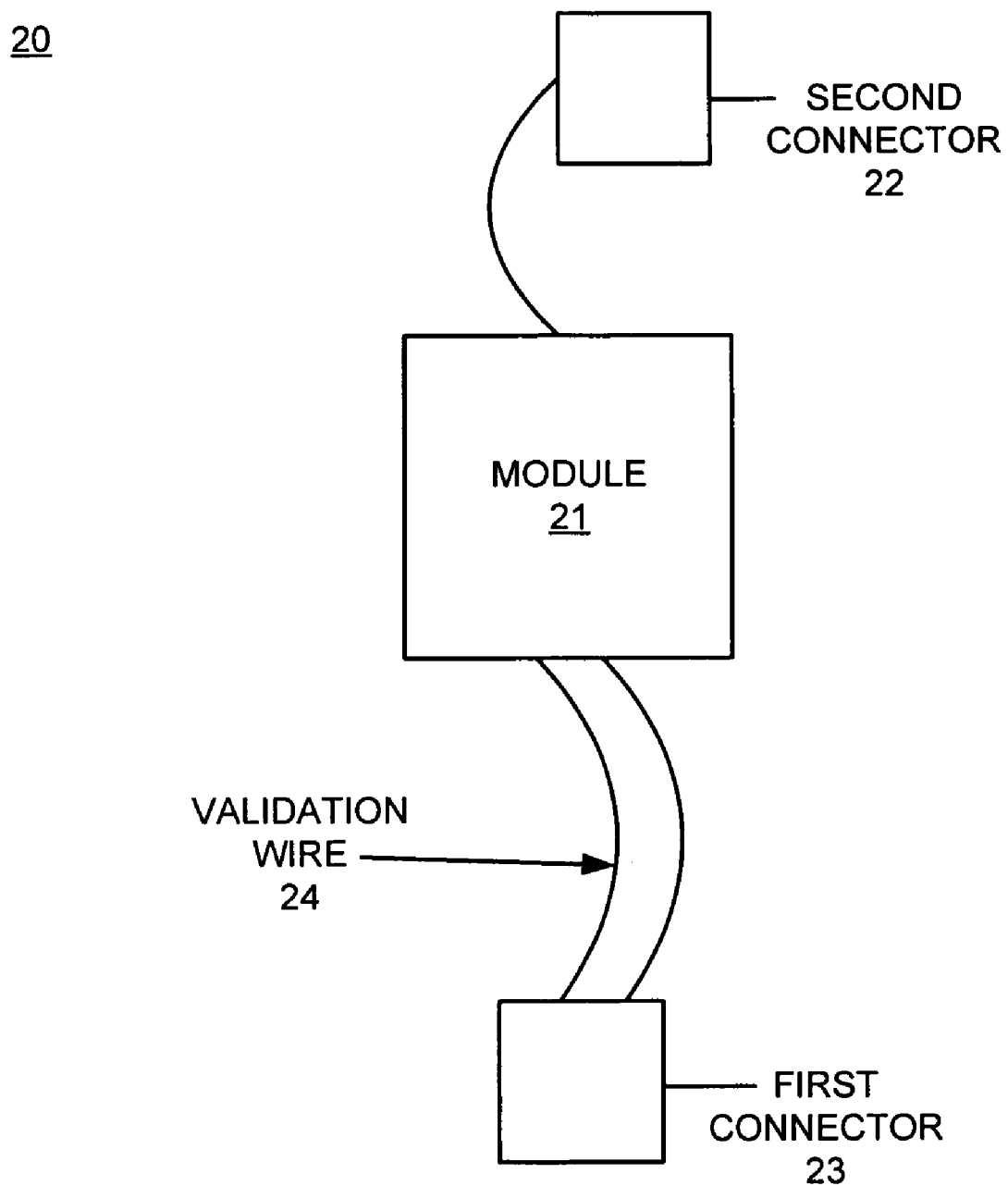
FIG. 2 is a block diagram of an embodiment of an interface module.

FIG. 2 is a block diagram of one embodiment of an interface element 20. As mentioned above, in one embodiment, interface element 20 is used to adapt a standardized communication port to a different type of communication port or connector utilized by, for example, a peripheral device.

In the example of FIG. 2, interface element 20 includes a module 21, a first connector 23 and a second connector 22. First connector 23 is configured to mate with (e.g., plug into) a standardized communication port (e.g., communication port 13 or 14 of FIG. 1), while second connector 22 is configured to mate with the particular type of connector (e.g., plug) used by, for example, a peripheral device. For example, second connector 22 may be configured as a USB port that accepts a USB plug. Module 21 can include any circuitry needed to adapt second connector 22 to first connector 23.

In one embodiment, a unique identifier (ID) is associated with each type of interface element 20. For example, a USB interface element has a unique ID, so that device 10 has the ability to determine that it is connected to a USB device. In general, an interface element's unique ID enables device 10 to determine the type of peripheral device attached to that interface element.

Instead of, or in addition to, acting as an adaptor, interface element 20 (specifically, module 21) of FIG. 2 can provide other functionality. As mentioned previously herein, interface element 20 can be used to turn a device on or off. As will be seen from the example of FIG. 3 below, interface element 20 can also be used to interrupt communication between a peripheral device and a computer system, to simulate connecting and disconnecting (plugging and unplugging) of the peripheral device from the computer system.

Furthermore, interface element 20 can be used to sense a value of a characteristic or attribute of the peripheral device or computer system to which it is connected. For example, interface element 20 (module 21) can be used to sense the power level of a computer system, in order to determine whether or not the computer system is in a reduced power state (e.g., a sleep mode or the like). As another example, interface element 20 can be used to sense the operating temperature of a computer system or peripheral device. Also, interface element 20 can be used to sense an environmental attribute. The sensed feedback can be used in various ways, examples of which are described in conjunction with FIGS. 3, 4 and 6, below.

In one embodiment, device 10 (FIG. 1) monitors interface element 20 (FIG. 2) to determine whether or not interface element 20 is functioning properly. In one such embodiment, the connection between device 10 and module 21 includes a validation wire 24 that can be used to determine whether module 21 is functioning properly. In a testing environment, for example, validation wire 24 can be used to distinguish a failure of module 21 from a failure of a peripheral device.

Device 10 can also incorporate various sense points that can be monitored, so that faults and failures in device 10 can be identified and distinguished from a failure of a peripheral device.

Figure 3:
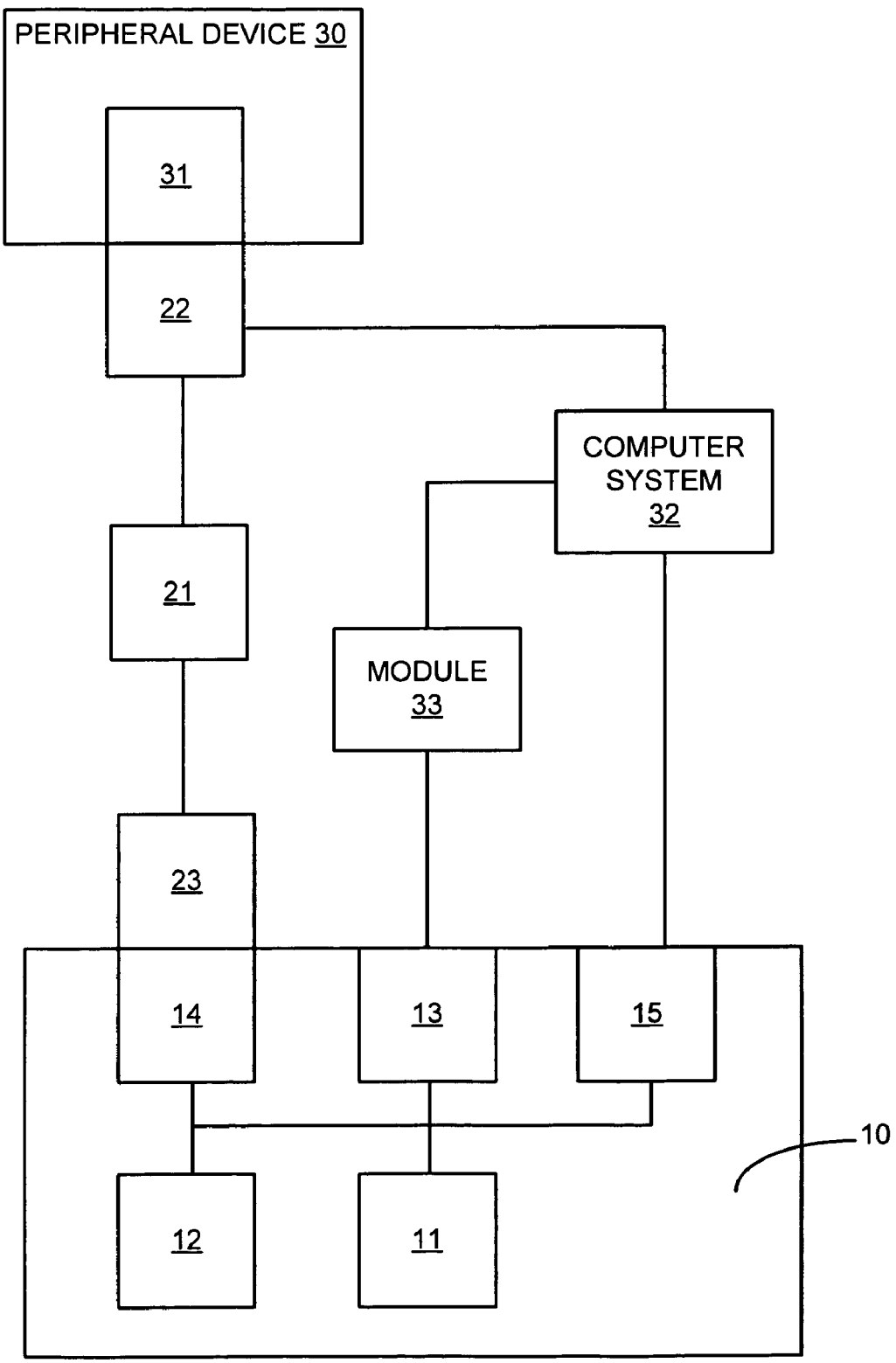
FIG. 3 is a block diagram showing an example of an arrangement of devices.

FIG. 3 is a block diagram showing an example of an arrangement of devices, in one embodiment. In the example of FIG. 3, device 10 is communicatively coupled (linked) to a computer system 32 and a peripheral device 30.

More specifically, in the example of FIG. 3, device 10 is linked to computer system 32 via communication port 15. In one embodiment, device 10 is linked to computer system 32 using a serial bus.

In another embodiment, device 10 is also linked to computer system via communication port 13. In the example of FIG. 3, communication port 13 is a standardized communication port, in which case the link is accomplished using an interface element such as interface element 20 of FIG. 2. In the example of FIG. 3, the link from communication port 13 to computer system 32 includes module 33, which can provide functionality such as that described above. For instance, module 33 can be used to turn computer system 32 on or off, to place computer system 32 in a reduced power state, or to monitor computer system 32 to determine when the computer system has entered a self-induced reduced power state.

With reference to FIG. 3, device 10 is also linked to peripheral device 30 via communication port 14. In the example of FIG. 3, communication port 14 is a standardized communication port, in which case the link is accomplished using an interface element such as interface element 20 of FIG. 2. Connector 22 is mated with port or connector 31 of peripheral device 30, and connector 23 is mated with port 14 of device 10.

As mentioned previously herein, peripheral device 30 may be a type of device that is operated external to computer system 32, such as a printer, scanner, etc. However, peripheral device 30 may also be a type of device, like a PCI card, that is installed inside of computer system 32 (e.g., it is inserted directly into a slot in the motherboard of the computer system 32). In the latter instance, although peripheral device 30 is installed inside computer system 32, it can still be linked to device 10.

Continuing with reference to FIG. 3, peripheral device 30 is also communicatively coupled to computer system 32 via a communication path that bypasses device 10. In the example of FIG. 3, the bypass link between peripheral device 30 and computer system 32 is achieved using a separate connecting wire that runs from connector 22. Alternatively, the bypass link between peripheral device 30 and computer system 32 could use module 21 as a terminal. In general, in the present embodiment, some portion of interface element 20 (FIG. 2) serves as a junction between the link between device 10 and peripheral device 30 and the bypass link between peripheral device 30 and computer system 32.

In operation, in a test environment, for example, device 10 can assert control over peripheral device 30—in effect, a command from device 10 would have primacy over a command from computer system 32, meaning that control of peripheral device 30 is subject to device 10. Consequently, in a testing environment, for example, many different scenarios can be readily tested. For example, a scenario can be tested in which peripheral device 30 and computer system 32 are operating together, interacting in a normal way, and at any point during that interaction, device 10 can intercede to turn off either peripheral device 30 or computer system 32. Alternatively, device 10 can intercede to effectively halt or interrupt communications from peripheral device 30 to computer system 32, in essence simulating a sudden unplugging of peripheral device 30 from computer system 32. In a similar fashion, device 10 can intercede to restore communications between peripheral device 30 and computer 32, in essence simulating plugging peripheral device 30 into computer system 32. Any of these actions, or like actions, can be repeated over and over with computer system 32 turned on or off or in a reduced power state, thereby testing—in an automated fashion—the effects of repeatedly plugging peripheral device into and unplugging peripheral device 30 from computer system 32 under various operating conditions.

In one embodiment, described further in conjunction with FIG. 5 below, different test scenarios can be executed using commands that are implemented as firmware written into memory unit 11. In one such embodiment, the commands are asynchronous commands that are executed by processing unit 12 independently of computer system 32. Thus, computer system 32 can be turned off or in a reduced power state, or can be diverted to other tasks, during testing. Furthermore, as will be seen, computer system 32 can be advantageously used to monitor test results. For example, return values associated with the execution of commands can be sent from device 10 to computer system 32, either asynchronously or synchronously.

Figure 4:
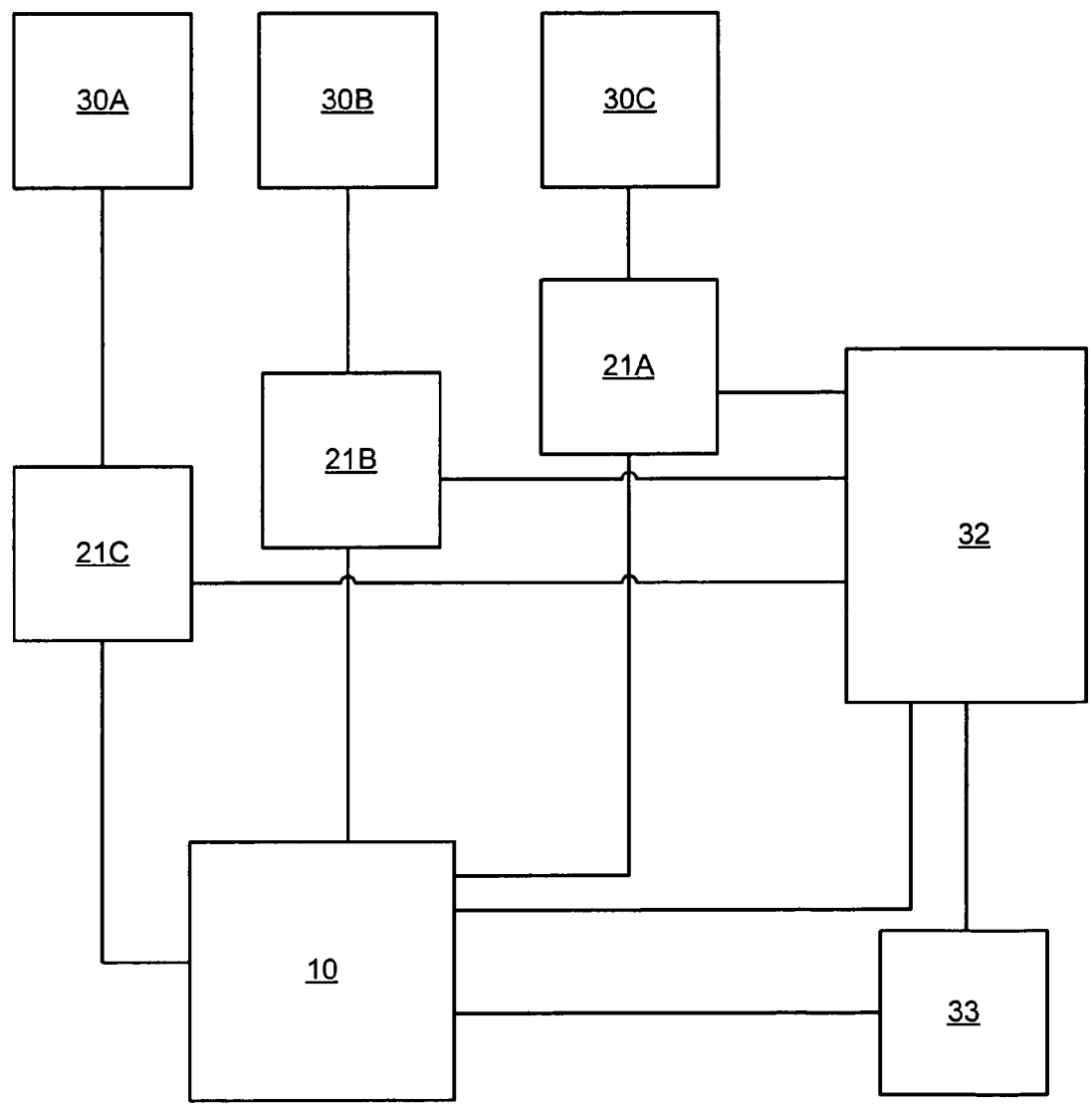
FIG. 4 is a block diagram showing another example of an arrangement of devices.

FIG. 4 is a block diagram showing another example of an arrangement of devices, in one embodiment. In the example of FIG. 4, device 10 is communicatively coupled (linked) to a number of peripheral devices 30A, 30B and 30C via interface elements (e.g., modules) 21C, 21B and 21A, respectively. As described previously herein, peripheral devices 30A-30C may utilize different types of communication interfaces or they may utilize the same type of communication interfaces. Although three peripheral devices are shown, there may be any number of such devices. In one embodiment, device 10 is simultaneously linked to eight devices (including computer system 32). In such an embodiment, if there are more than eight peripheral devices to be linked to device 10, then more than one control unit (e.g., device 10) can be used in parallel.

In the example of FIG. 4, device 10 is linked to computer system 32 by, for example, a serial bus, and device 10 is also linked to computer system 32 by an interface element that includes module 33.

In the example of FIG. 4, in addition to being linked to device 10, the peripheral devices 30A-30C are each linked to computer system 32 by separate communication paths that bypass device 10.

In a test environment, for example, an arrangement such as that exemplified in FIG. 4 allows for different combinations of peripheral devices 30A-30C to be tested. As well, different combinations of peripheral devices 30A-30C can be tested with computer system 32 in different operating states.

In operation, device 10 acts to switch peripheral devices 30A-30C on or off in different combinations, to simulate the plugging and unplugging of different combinations of those devices into and out of computer system 32. Specifically, device 10 causes the modules 21A-21C to turn the peripheral devices 30A-30C on and off. Rather than causing the peripheral devices 30A-30C to be turned on and off, device 10 may use modules 21A-21C to periodically interrupt the link between peripheral devices 30A-30C and computer system 32. Generally speaking, under control of device 10 and using modules 21A-21C, the plugging and unplugging of peripheral devices 30A-30C from computer system 32 is simulated. That is, peripheral devices 30A-30C are not actually disconnected from and reconnected to computer system 32, but from the perspective of computer system 32, they appear to be.

Furthermore, using modules 21A-21C, operating characteristics (e.g., temperature, pressure, power level, etc.) of peripheral devices 30A-30C can be sensed. The sensed feedback information can be used by device 10 to control the performance of the peripheral device being sensed, or it can be used by device 10 to control the performance of another device.

In addition, device 10 can independently control computer system 32. For example, through module 33, device 10 can interrupt or restore the power supply to computer system 32, to turn computer system 32 off or on. Alternatively, device 10 can execute a command that causes computer system 32 to enter a reduced power state or to shut down.

Moreover, through module 33, device 10 can monitor computer system 32 to determine the current power mode of computer system 32. In one embodiment, module 33 senses the power level at which computer system 32 is operating. For example, module 33 can be connected to the power supply of computer system 32 to sense power level, and the sensed power level can be used to deduce whether computer system 32 is in a reduced power state. In another embodiment, computer system 32 executes a program in which heartbeat messages are sent at predetermined intervals from computer system 32 to device 10. The program is configured such that, if computer system 32 is in a reduced power state, then the heartbeat messages are not sent. Accordingly, device 10 can recognize when computer system 32 is in a reduced power state by the absence of the heartbeat messages. This latter embodiment (using heartbeat messages) can be implemented via the serial bus connection between device 10 and computer system 32. Although module 33 may not be needed in the latter embodiment to sense power level, module 33 can still play a role in controlling computer system 32, as described previously herein.

Figure 5:
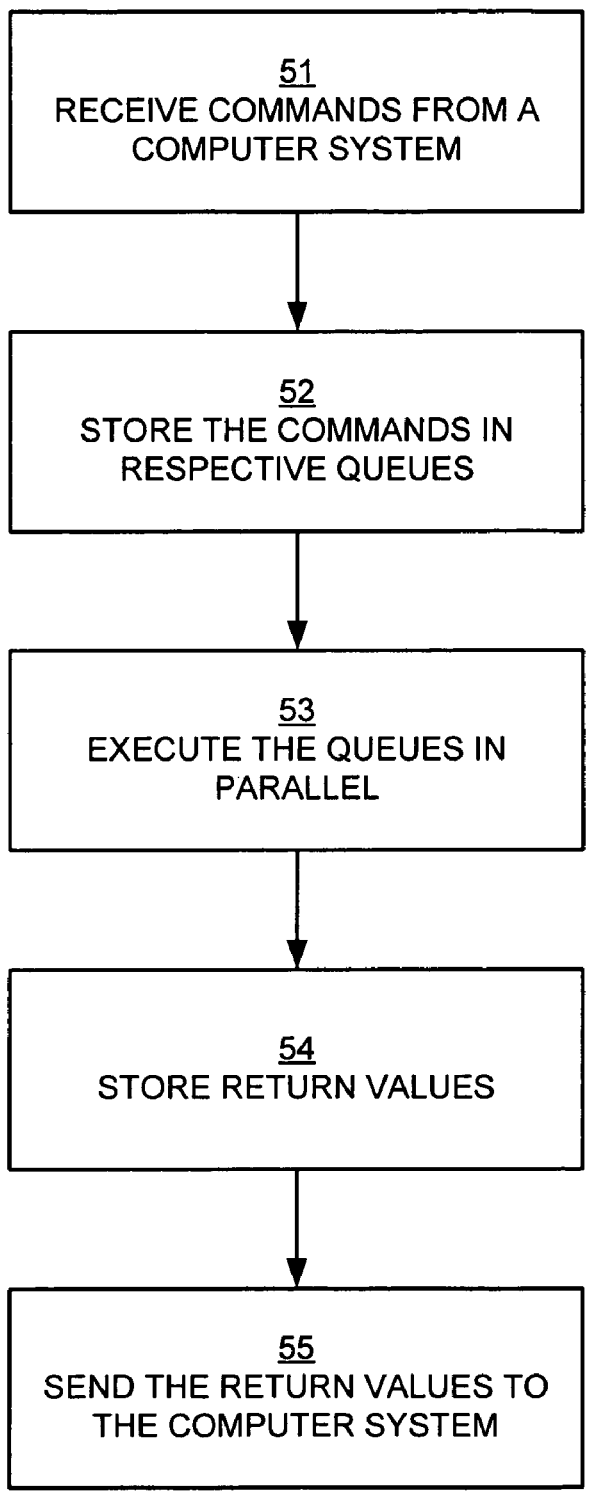
FIG. 5 is a flowchart of an embodiment of a method for controlling devices.

FIG. 5 is a flowchart, 50 of one embodiment of a method for controlling devices. Although specific steps are disclosed in flowchart 50, such steps are exemplary. That is, embodiments are well-suited to performing various other steps or variations of the steps recited in flowchart 50. It is appreciated that the steps in flowchart 50 may be performed in an order different than presented, and that not all of the steps in flowchart 50 may be performed. All of, or a portion of, the methods described by flowchart 50 may be implemented using computer-readable and computer-executable instructions which reside, for example, in computer-usable media of a computer system.

In one embodiment, the methods described by flowchart 50 are implemented as firmware written into memory unit 11 and executed by processing unit 12 of device 10 (FIG. 1). In one embodiment, the firmware has a self-monitoring feature, in which the firmware can determine whether a particular portion of device 10 hardware (or an external attachment to device 10 hardware) is not properly connected.

In block 51 of FIG. 5, with reference also to FIGS. 3 and 4, device 10 receives commands from computer system 32. That is, for example, to enable a particular set of tests, a human user (e.g., a programmer or the like) uses computer system 32 (or another computer system that can be linked to device 10) to program a set of commands that, in turn, can be used by device 10 to automatically implement the tests. The commands can include synchronous commands and/or asynchronous commands.

As used herein, a synchronous command is issued by computer system 32 to device 10, which in one embodiment executes the command and returns a value associated with the command to computer system 32 before a next command is issued by computer system 32. In such an embodiment, the computer system 32 waits until the device 10 executes the instructions and sends return values back; once this is completed, computer system 32 proceeds with its next remaining tasks. In general, in the case of a synchronous command, computer system 32 remains in contact with device 10. Synchronous commands need not be stored in queues.

As used herein, an asynchronous command can be executed independently of computer system 32. Accordingly, computer system 32 can issue a series of asynchronous commands to device 10, and computer system 32 can then be shut down (or placed in a reduced power mode, or diverted to some other activity) while device 10 executes the commands. That is, computer system 32 need not wait for the commands to execute. In the case of asynchronous commands, return values associated with execution of the commands can be stored by device 10 and then sent to computer system 32 at some later time.

In one embodiment, a synchronous command or data packet includes a serial stream of data that is three bytes long. A synchronous command can instruct device 10 to turn on or off a certain channel (e.g., a communication port of device 10) and is executed immediately. An example of a synchronous command to turn on channel 1 is: "f11." Turning a channel on and off simulates connecting and disconnecting a peripheral device associated with that channel.

In one embodiment, the command includes three fields:
|mode type (1 byte)|type of action (1 byte)|channel affected (1 byte)|.

Note that this example is a text serial stream and not a binary stream, and no additional header or tail markers (e.g., \n.\0) are present or used. In one embodiment, the various fields of the command are defined as follows, based on the example above:

1 byte "f"=type of mode ("a"=debug print pins status, "b"=debug mode manually set channels, "c"=asynchronous mode, "f"=synchronous mode);

1 byte "1"=action (0=turn off, 1=turn on, 3=pulse 'turn on computer'); and 1 byte "1"=channel affected (channel 1 in this example).

If an error occurs, a serial text string can be sent from device 10 to computer system 32.

In one embodiment, an asynchronous command or data packet includes a serial stream of data. In one such embodiment, the various fields of the command are defined as follows:

|mode type (1 byte)|which queue (1 byte)|mode action (1 byte) channel affected (1 byte)|command type (2 bytes)|ignore all sense (1 byte) sense lines (8 bytes)|sense direction (8 bytes)|timer to wait before executing action (8 bytes)|timeout (8 bytes).

An example of an asynchronous command to turn on channel 1 is:

"c00101100000000000000000000000010".

Note that this example is a text serial stream and not a binary stream, and no additional header or tail markers (e.g., \n.\0) are present or used. In one embodiment, the various fields of the command are defined as follows, based on the example above:

1 byte "c"=type of mode ("a"=debug print pins status, "b"=debug mode manually set channels, "c"=asynchronous mode, "f"=synchronous mode);

1 byte "0"=command queue to store this command or data packet;

1 byte "0"=type of action to perform in this mode (see below);

1 byte "1"=channel (e.g., 01 to 08) that will be affected with this command;

2 bytes "01"=command to perform (e.g., "01"=on, "00"=off);

1 byte "1"=ignore all sense types (for synchronous commands);

8 bytes "00000000"=sense lines to monitor;

8 bytes "00000000"=sense direction to monitor;

8 bytes "00000000"=time to wait before executing the command; and 8 bytes "00000010"=wait 10 seconds, for example, if action does not occur, then time out and fail the command.

The mode action is of the form "c?xxxxxxxxxxxxxxxxxxxxxxxxxxxxxxxxxxxxxxxx" where "c"=set to asynchronous mode; "?" can be "0" (clear asynchronous queue), "1" (insert command into queue), "2" (execute commands in queue) or "3" (list status of queue); and "x . . . " varies depending on the command and type of mode action.

An error message can be sent from device 10 to computer system 32 over the serial bus connection at any time.

In block 52 of FIG. 5, with reference also to FIGS. 3 and 4, asynchronous commands are separated into respective queues in memory unit 11. For instance, a first subset of the commands is placed into a first queue, and a second subset of the commands is placed into a second queue. The first queue may be associated with one channel or communication port and thus one of the peripheral devices 30A-30C, and the second queue may be associated with another channel or communication port and thus another one of the peripheral devices 30A-30C. Alternatively, both queues may be associated with the same peripheral device. Although this example describes two queues, two devices and two subsets of commands, it can be readily extended to any number of queues, devices and subsets. The queues may have the same or different lengths.

The queues are used to maintain the order of execution of commands and also to store the return values associated with the commands until the return values are sent to computer system 32 (or fetched by computer system 32). The number of queues is flexible, depending on memory capacity and the processing capabilities of device 10.

In block 53 of FIG. 5, the various queues are executed in parallel (essentially, they are executed at the same time). In one embodiment, the queues are executed in round robin fashion until all of the commands in each queue have been executed. During execution of the asynchronous commands, computer system 32 (FIGS. 3 and 4) may be shut down or in a reduced power state or the like.

In block 54 of FIG. 5, the return values associated with execution of the commands are stored in memory unit 11 (FIG. 1) until they can be sent to computer system 32. In one embodiment, if available memory is used up, then the return values (and any associated status bits) are cleared before additional commands can be executed. In one such embodiment, a user at computer system 32 is notified that available memory has been used up.

In block 55 of FIG. 5, the return values are sent to computer system 32. If there are additional commands, then flowchart 50 returns to block 51.

Although the discussion herein has been primarily with regard to the testing of devices used in the computer industry, the features described herein can be extended to other applications in other types of industries. More specifically, embodiments can be used in applications that require the switching or control of electrical supply to devices or equipment, for testing or for other applications. In particular, because operating characteristics of a device can be sensed and the sensed feedback used to control the performance of that device, or to control the performance of another device, applications other than testing can be envisioned.

Figure 6:
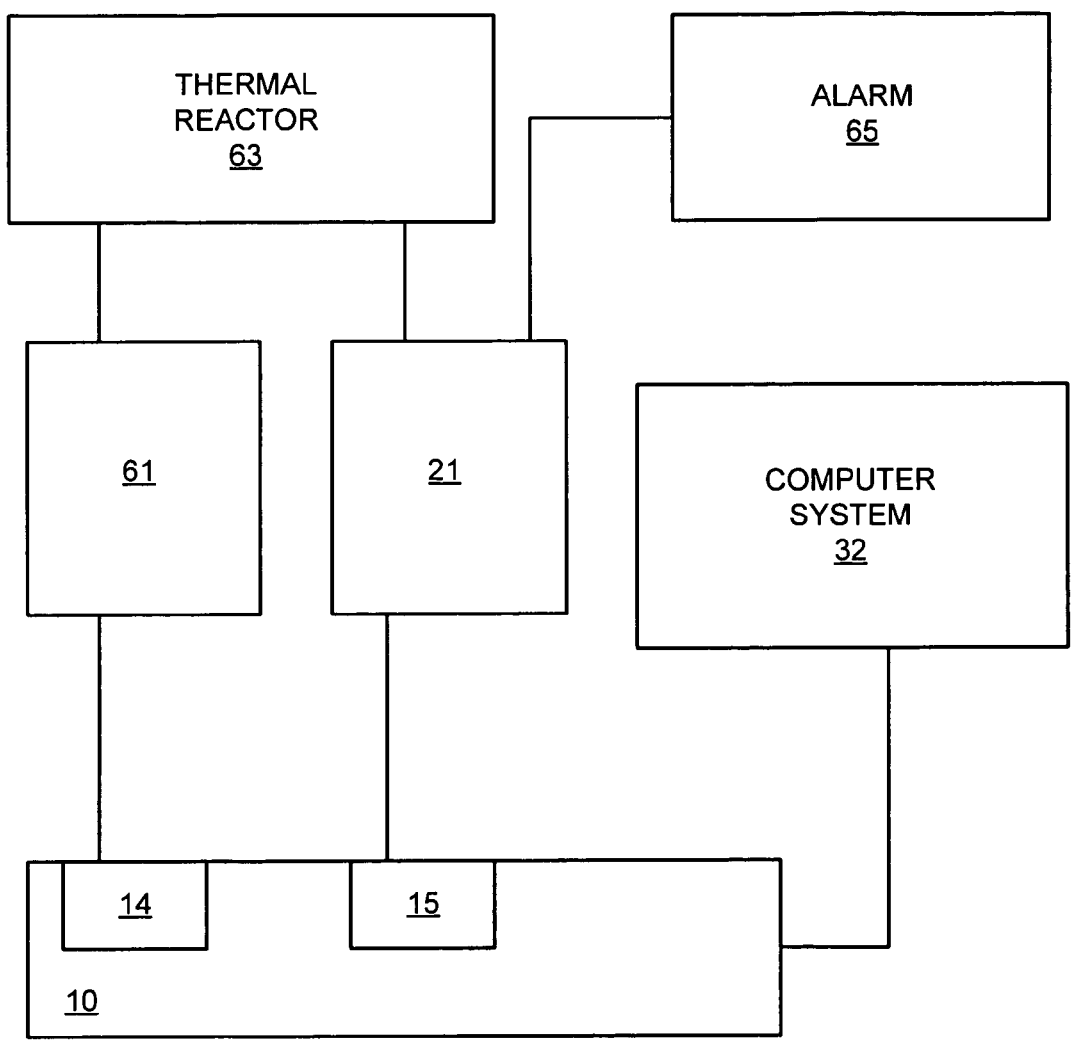
FIG. 6 is a block diagram showing another example of an arrangement of devices.

FIG. 6 is a block diagram showing another example of an arrangement of devices, in one embodiment. In the example of FIG. 6, interface module 61 is configured to sense operating characteristics such as the temperature, pressure and/or power level of a peripheral device such as thermal reactor 63. As another example, an automobile's engine temperature can be sensed. Environmental attributes such as ambient temperature can also be sensed. Device 10 can be used to control a separate entity such as alarm 65.

In the example of FIG. 6, one of the interfaces or connectors of interface module 61 mates with a port 14 of device 10, and another of the interfaces or connectors of interface module 61 is fashioned to accommodate a sensor that converts temperature to voltage. The interface module 61 provides feedback to device 10. If the feedback from interface module 61 indicates that the sensed temperature has reached a temperature threshold, then the firmware on device 10 is programmed to automatically activate alarm 65.

Alternatively, computer system 32 can be connected to device 10. Computer system 32 can read the sensed temperature value received from interface module 61 and send a command to device 10 to activate alarm 65.

In general, device 10 can be used in a manner similar to that just described to monitor various environmental or physical attributes associated with a peripheral device, and control that peripheral device or another one based on the value of the monitored attribute.

In summary, as described herein, the switching and control of the electrical supply to devices is flexible and, because it is programmable, can be performed automatically instead of manually. That is, for example, a human user does not need to manually plug and unplug devices; instead, this activity is simulated by controlling the electrical supply to the devices, or by controlling (e.g., interrupting or halting) communication from the devices. Various combinations of devices can be controlled in different ways, according to different programmed scenarios. In one embodiment, the switching action is performed using interface elements that are separate from the control unit (e.g., device 10 of FIG. 1). Accordingly, the control unit can be readily extended to new types of communication interfaces and new types of peripheral devices.

Also, asynchronous commands can be used so that activities can be performed while a controlling computer system is in an inactive (e.g., reduced power) state. Complex scenarios, in which devices (including the computer system) are turned on and off in various combinations and under various conditions, can be readily implemented and managed.

Various embodiments are thus described. While described in particular embodiments, the present invention should not be construed as limited by such embodiments, but rather construed according to the following claims.

What is claimed is:

1. An apparatus comprising:
   a memory unit;
   a processor coupled to said memory unit;
   a first communication port coupled to said processor and configured to provide a first communication path between said apparatus and a computer system; and
   a second communication port coupled to said processor and configured to provide a second communication path between said apparatus and a peripheral device that is communicatively linked with said computer system via a third communication path that bypasses said apparatus;
   wherein control of said peripheral device is subject to said apparatus.

2. The apparatus of claim 1 wherein an interface element adapts said second communication port to a type of communication interface used by said peripheral device, wherein said third communication path comprises said interface element and wherein said apparatus causes said interface element to simulate plugging and unplugging of said peripheral device.

3. The apparatus of claim 2 wherein said apparatus monitors functionality of said interface element.

4. The apparatus of claim 2 wherein said interface element is associated with a unique identifier that enables said apparatus to determine said type of peripheral device.

5. The apparatus of claim 1 wherein said apparatus causes said peripheral device to be turned on and turned off.

6. The apparatus of claim 1 wherein said apparatus causes said computer system to be turned on and turned off.

7. The apparatus of claim 1 wherein an attribute of said peripheral device is sensed, wherein said apparatus affects said control according to a sensed value of said attribute.

8. The apparatus of claim 1 wherein an attribute of a second peripheral device communicatively linked to said apparatus is sensed, wherein said apparatus affects said control according to a sensed value of said attribute.

9. The apparatus of claim 1 wherein an attribute of said computer system is sensed, wherein said apparatus affects said control of said peripheral device according to a sensed value of said attribute.

10. The apparatus of claim 1 wherein an attribute is sensed, wherein said apparatus affects said control of said peripheral device according to a sensed value of said attribute.

11. The apparatus of claim 1 wherein said apparatus receives heartbeat messages from said computer system, wherein said heartbeat messages are not sent by said computer system when said computer system is in a reduced power state.

12. The apparatus of claim 1 wherein said control is asserted according to commands received from said computer system, wherein said commands are stored by said apparatus in respective queues and wherein said queues are executed in parallel.

13. An apparatus comprising:
a memory unit;
a processor coupled to said memory unit;
a first communication port coupled to said processor and configured to provide a first communication path between said apparatus and a computer system; and
a second communication port coupled to said processor and configured to provide a second communication path between said apparatus and a peripheral device that is communicatively linked with said computer system via a third communication path that bypasses said apparatus;
wherein control of said peripheral device is subject to said apparatus;
wherein an interface element adapts said second communication port to a type of communication interface used by said peripheral device, wherein said third communication path comprises said interface element and wherein said apparatus causes said interface element to simulate plugging and unplugging of said peripheral device.

14. The apparatus of claim 13 wherein said apparatus causes communications between said peripheral device and said computer system to be interrupted.

15. The apparatus of claim 13 wherein said apparatus causes communications between said peripheral device and said computer system to be restored.

16. The apparatus of claim 13 wherein a firmware written into the memory unit and executed by the processor comprises a self-monitoring feature enabling the firmware to determine whether one or more portions of the apparatus are not properly connected.

17. The apparatus of claim 13 wherein a return value associated with an execution of a command is sent from the apparatus to the computer system.

18. The apparatus of claim 13 wherein an attribute is sensed, wherein said apparatus affects said control of said peripheral device according to a sensed value of said attribute.

19. The apparatus of claim 13 wherein the computer system is used to program one or more commands, wherein one or more of the commands are used by said apparatus to implement tests.

20. The apparatus of claim 13 wherein said control is asserted according to one or more commands received from said computer system, wherein one or more of said commands are stored by said apparatus in respective queues and wherein said queues are executed in parallel.

* * * * *